United States Patent [19]

Callander et al.

[11] Patent Number: 5,276,852
[45] Date of Patent: Jan. 4, 1994

[54] METHOD AND APPARATUS FOR CONTROLLING A PROCESSOR BUS USED BY MULTIPLE PROCESSOR COMPONENTS DURING WRITEBACK CACHE TRANSACTIONS

[75] Inventors: Michael A. Callander, Hudson; Douglas E. Sanders, Farmingham, both of Mass.

[73] Assignee: Digital Equipment Corporation, Maynard, Mass.

[21] Appl. No.: 32,814

[22] Filed: Mar. 15, 1993

Related U.S. Application Data

[63] Continuation of Ser. No. 591,198, Oct. 1, 1990, abandoned.

[51] Int. Cl.$^5$ .............. G06F 12/00; G06F 13/00; G06F 13/28
[52] U.S. Cl. .................. 395/425; 395/400; 364/DIG. 1; 364/240.2; 364/242.31; 364/243.2; 364/260
[58] Field of Search .............. 395/400, 425; 364/200MS, 900MS

[56] References Cited

U.S. PATENT DOCUMENTS

| | | | |
|---|---|---|---|
| 3,967,247 | 6/1976 | Anderson et al. | 395/250 |
| 4,142,234 | 2/1979 | Bean et al. | 364/200 |
| 4,195,340 | 3/1980 | Joyce | 364/200 |
| 4,802,085 | 1/1989 | Levy et al. | 364/200 |
| 4,831,520 | 5/1989 | Rubinfield et al. | 364/200 |
| 4,858,111 | 8/1989 | Steps | 495/425 |
| 4,860,192 | 8/1989 | Sachs et al. | 395/400 |
| 4,884,197 | 11/1989 | Sachs et al. | 395/425 |
| 4,899,275 | 2/1990 | Sachs et al. | 395/425 |
| 4,933,835 | 6/1990 | Sachs et al. | 395/425 |
| 4,933,845 | 6/1990 | Hayes | 395/325 |
| 4,959,777 | 9/1990 | Holman, Jr. | 395/325 |
| 4,987,529 | 1/1991 | Craft et al. | 364/200 |
| 5,008,813 | 4/1991 | Crane et al. | 395/425 |
| 5,025,365 | 6/1991 | Mathur et al. | 364/200 |
| 5,041,962 | 8/1991 | Lunsford | 364/200 |
| 5,058,006 | 10/1991 | Durdan et al. | 395/325 |
| 5,067,071 | 11/1991 | Schanin et al. | 395/275 |
| 5,072,369 | 12/1991 | Theus et al. | 395/425 |
| 5,091,846 | 2/1992 | Sachs et al. | 395/425 |
| 5,091,850 | 2/1992 | Culley | 395/400 |
| 5,119,485 | 6/1992 | Ledbetter et al. | 395/425 |
| 5,150,467 | 9/1992 | Hayes et al. | 395/325 |
| 5,155,824 | 10/1992 | Edenfield et al. | 395/425 |
| 5,155,843 | 10/1992 | Stamm et al. | 395/575 |
| 5,157,774 | 10/1992 | Culley | 395/425 |

*Primary Examiner*—Joseph L. Dixon
*Assistant Examiner*—Frank J. Asta
*Attorney, Agent, or Firm*—Albert P. Cefalo; A. Sidney Johnston; James F. Thompson

[57] ABSTRACT

A CPU module has a processor, cache memory, cache controller, and system interface attached to a processor bus. The system interface is attached to a system bus shared by memory, I/O, and other CPU modules. The cache controller requests control of the processor bus from the processor, and grants control to the system interface. The system interface uses the processor bus to store fill data obtained from memory into the cache in response to a read miss. The system interface also monitors system bus traffic and forwards the addresses of cache blocks to be invalidated to the cache controller over an invalidate bus. The cache controller requests control of the processor bus during a read miss to perform invalidates and writebacks. The processor grants control to the cache controller before the read miss completes, enabling the cache controller to proceed, and then re-issues the read. A protocol between the cache controller and the system interface ensures that cache fills, invalidates, and writebacks are done in the correct order to maintain data coherency. As part of this protocol, the cache controller decides when the system interface may proceed with a fill, and grants the processor bus to the system interface accordingly.

19 Claims, 2 Drawing Sheets

METHOD AND APPARATUS FOR CONTROLLING A PROCESSOR BUS USED BY MULTIPLE PROCESSOR COMPONENTS DURING WRITEBACK CACHE TRANSACTIONS

This application is a continuation, of application Ser. No. 07/591,198 filed Oct. 1, 1990 now abandoned.

FIELD OF THE INVENTION

This invention relates to a protocol for establishing ownership of a bus, and more particularly relates to multiple components establishing bus ownership, as required in a multiple processor environment using a cache write-back protocol.

CROSS REFERENCE TO RELATED APPLICATIONS

The present application is related to the following applications filed at the same time as this application:

U.S. patent application Ser. No. 07/591,197, filed Oct. 1, 1990, by Douglas Elliott Sanders and Michael A. Callander, entitled METHOD AND APPARATUS FOR FILTERING INVALIDATE REQUESTS;

U.S. patent application Ser. No. 07/591,196, filed Oct. 1, 1990, by Michael A. Callander, Linda Chao and Douglas Elliott Sanders, entitled APPARATUS FOR SUPPRESSING AN ERROR REPORT FROM AN ADDRESS FOR WHICH AN ERROR HAS ALREADY BEEN REPORTED;

U.S. patent application Ser. No. 07/591,195, filed Oct. 1, 1990, by Soha Mahmoud Nadim Hassoun and Douglas Elliott Sanders, entitled AN IMPROVED PARITY GENERATOR;

U.S. patent application Ser. No. 07/591,199, filed Oct. 1, 1990, by Michael A. Callander, entitled WRITE-BACK CACHE WITH ECC PROTECTION; and, U.S. patent application Ser. No. 07/591,186, filed Oct. 1, 1990, by Douglas Elliott Sanders, Michael A. Callander and Linda Chao, entitled METHOD AND APPARATUS FOR COMPLETING A DEFERRED READ REQUEST IN THE PRESENCE OF AN ERROR; all disclosures of the above referenced applications for United States Patent are hereby incorporated by reference herein.

BACKGROUND OF THE INVENTION

Modern computer systems are often designed to operate with multiple processors communicating with a shared memory. The processors and the memory communicate through a system bus. Also, input and output modules are usually connected to the system bus.

The design of a processor module, hereinafter referred to as a CPU module, often includes a cache memory. The cache memory provides fast local memory data to the processor chip. Typically, the CPU module incorporates a module-level processor bus. The components of the CPU module often include the CPU processor chip, a system interface which connects directly to the system bus, and the cache memory; and these components communicate using the processor bus.

The protocol in the module level processor bus is determined, in many cases, by the design of the processor chip. An often utilized protocol for the processor chip is that the processor chip serves as a bus master, and other components on the processor bus serve as slaves. A frequently used protocol is that the processor chip responds to a single "bus request" line and provides a grant signal on a single "bus grant" line. Receipt of the bus grant signal by another component connected to the processor bus permits the other component to gain control of the bus and perform transactions. When only a processor chip and a system interface chip compete for control of the bus, this simple control system is adequate, as the system interface chip may control the cache.

In previous designs, using the less complex cache write-through protocol, there is no requirement that the cache control chip obtain control of the processor bus. The cache control chip need only respond to signals on the processor bus, and control is managed by the system interface, as disclosed by Sullivan, et al, "The VAX 6000 Model 400 Scalar Processor Module", in Digital Technical Journal Vol. 2, No. 2, Spring 1990, Pages 27–35; and Durdan, et al, "An Overview of the VAX 6000 Model 400 Chip Set", Digital Technical Journal, Vol. 2, No. 2, Pages 36–51, Spring 1990. The processor chip and the system interface can function with a simple master-slave protocol with the processor chip responding to a single "bus request" line and granting access to the bus on a single "bus grant" line.

However, in a more complex control system having a cache write-back protocol, the simple master slave control of the processor bus may prove inadequate because a more complex control protocol is required. For example, the more complex control protocol of a cache write-back system may require a cache control chip to be added to the CPU module, and then there are at least three chips competing for access to the processor bus: the processor chip; the system interface; and the cache control chip. For three separate chips competing for access to the processor bus, the single master slave protocol is inadequate. And the single master slave protocol is particularly inadequate in the situation where the processor does not have any simple provision for acquiring the information necessary to decide whether the cache control chip or the system interface should gain access to the processor bus; and further where the processor has no simple way of granting control of the processor bus to a selected one of, the cache control chip or the system interface.

SUMMARY OF THE INVENTION

Access to a processor bus is provided for the processor, a cache controller, and a system interface by the invention.

The invention is an apparatus to control a write-back cache, comprising: a processor bus; a system interface for connection to a system bus, the system interface also providing a connection to the processor bus; a processor, the processor connected to the processor bus, the processor being a commander node for the processor bus; a cache memory, the cache memory connected to the processor bus; a cache controller, the cache controller connected to the processor bus; first request means for the cache controller to request control of the processor bus, the request directed to the processor; means for the processor to grant command of the processor bus to the cache controller; and a second request means for the system interface to request command of the processor bus from the cache controller. And the invention has a means, responsive to the second request means, for the cache controller to grant command of the processor bus to the system interface. As a result, the processor and the cache memory perform a writeback protocol by the cache controller granting control of the processor bus to the system interface, for the system interface to perform writeback transfers of data between the cache memory and the system bus.

Also the invention has a means for the cache controller to take control of the processor bus from the processor. The means for the cache controller to take control of the processor bus from the processor is a means for the cache controller to assert a retry signal; and, a means for the processor to give command of the processor bus to the cache controller upon receipt of the retry signal.

Other and further aspects of the present invention will become apparent in the course of the following description, and will be referenced to the accompanying drawings.

BRIEF DESCRIPTION OF THE DRAWINGS

Referring now to the drawings in which like numerals represent like parts in the several views.

DETAILED DESCRIPTION

Figure 1:
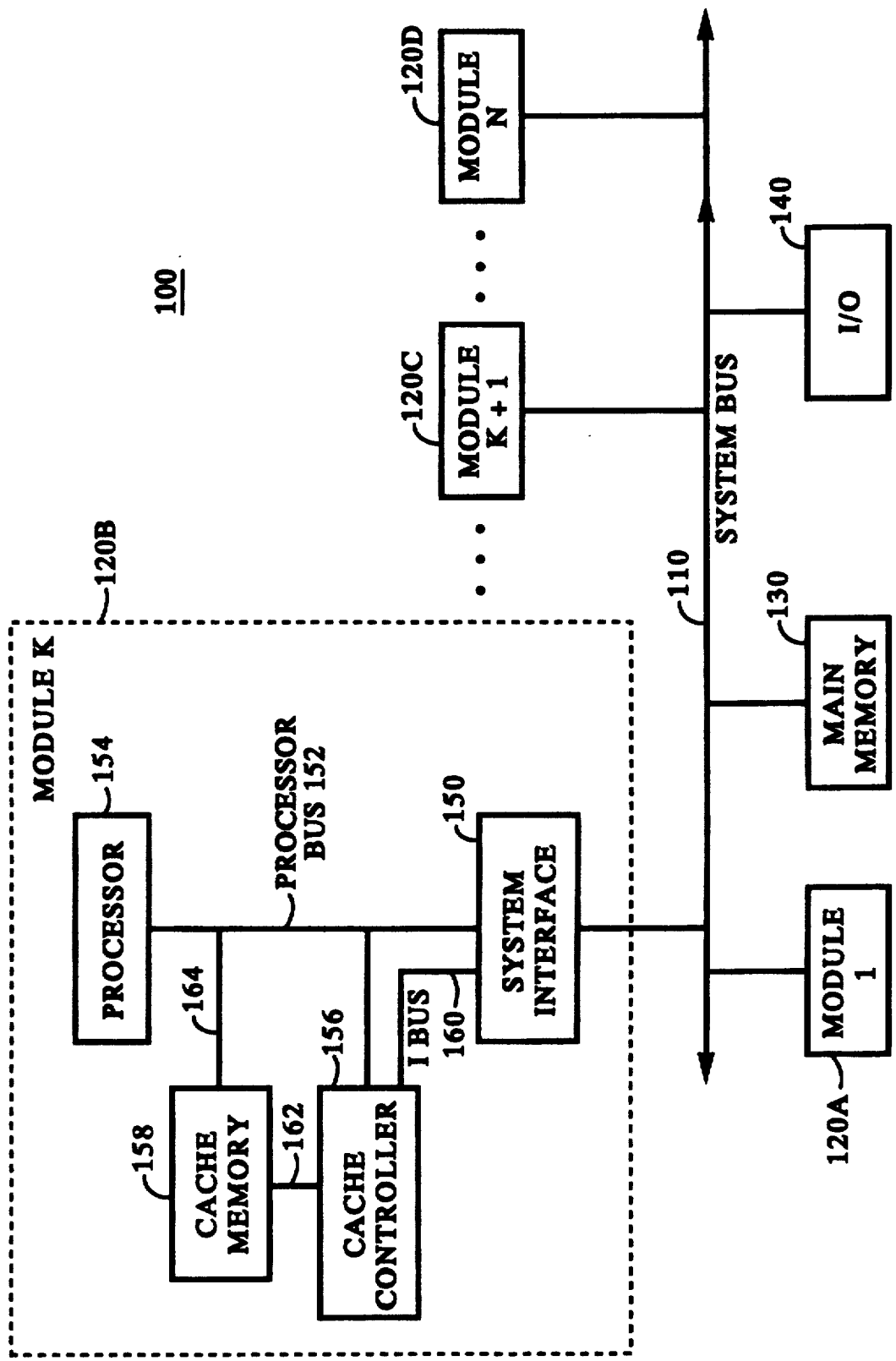
FIG. 1 is a block diagram of a multi-processor computer system according to the invention.

Referring now to FIG. 1, multi-processor computer system 100 is shown. Multi-processor computer system 100 comprises a system bus 110, a first processor CPU module 120A, a second processor CPU module, indicated as "Module K" 120B, a third processor CPU module indicated as "Module K+1" 120C, and an N'th module 120D. For example, the number of processor modules included in the multi-processor system may be 2 processors, 8 processors, 16 processors, or any convenient number of independent processors. Each of the processors, 120A, 120B, . . . communicate via the system bus 110.

Also communicating on system bus 110 is the main memory 130. Also a system input/output, referred to as an I/0 module 140, also communicates on system bus 110.

An overview of the internal structure of a CPU module is shown at module 120B. The module shown at 120B gives the internal structure of the other CPU module, 120A, 120C, 120D, etc. Internal to the CPU processor, as shown by module 120B, is a system interface 150. Connected to the system interface 150 is processor bus 152. Communicating on processor bus 152, in addition to the system interface 150, are the processor 154 the cache controller 156, and the cache memory 158. The cache memory 158 comprises the cache data of the CPU module 120B. The cache controller 156 derives signals both from the processor bus 152 and from an invalidate bus 160. The invalidate bus 160 transfers signals between the system interface 150 and the cache controller 156.

Control of the cache memory 158 is accomplished by cache controller 156 along connection 162. The cache memory transfers data to and from processor 154 through connection 164 to the processor bus 152, and also accomplishes data transfers to and from system bus 110 through processor bus 152 and system interface 150.

A general description of operation of a processor module, such as CPU model 120B, follows. Main memory 130 is the shared storage resource for data and instructions for all of the processor modules, 120A . . . 120D, etc. When a processor, such as processor 154 in CPU module 120B, desires to read data from main memory 130, the read request goes first to the cache memory 158 on the module board of the processor, such as shown for CPU module 120B. In the event that the requested data is in cache 158, and the requested data is neither "invalid" nor "dirty" disclosed in detail herein below, then the data in cache 158 is delivered to processor 154 through connection 164 and the processor bus 152. In the event that the requested data is not in cache 158, then a request is generated and transmitted by system interface 152 to main memory 130 through system bus 110, and the data in main memory 130 is read. Reading the data from main memory 130 by processor 154 comprises transferring the requested data through system interface 150 to cache 158, where the data is then transferred from cache 158 to processor 154.

Data in main memory 130 is stored in blocks, and each block has a starting address, and the data within the block may be referenced by reference to the starting address. The data stored in cache 158 carries with it the starting address of main memory in order that the location in main memory of the origin of the cache data may be identified.

The cache controller 156 contains information, known as a tag store, that denotes the state of the cache memory 158. This tag store maintains the status of each block of the cache.

For every block of data in the cache memory 158 there is a related cache entry in the tag store. This tag entry consists of an address portion and state bits. The address portion of the tag entry is the portion of the address that is not used to access the cache memory 158. Because many addresses can access the same cache memory 158 location, the address portion of the tag entry is maintained to keep track of the complete main memory 130 address of the data currently in the cache.

Each block of cache memory 158 is organized as four subblocks. The subblock is also known as the "fill" block and is the amount of data that is actually brought into the cache during read and ownership requests from memory.

The state bits in the tag store are known as valid bits and dirty bits. Each subblock has an associated valid bit and a dirty bit to designate its status. The valid bit is used to indicate that a cache block is resident in the cache memory 158. The dirty bit is used in the "writeback protocol" to denote "write-ownership", meaning that the associated processor can write to the block.

In the event that another CPU module, say CPU module 120C, attempts to write to main memory into the block having a starting address, for the same block as stored in cache 158, a status bit in cache 158 is set to "invalid". Thus the invalid status bit in cache 158 indicates that the data in cache 158 differs from the most recent update of data in the same block in main memory 130.

In the event that processor 154 attempts to read data from a block marked "invalid" in cache 158, then a cycle is initiated wherein the current values of the data in main memory 130 are transferred to cache 158 before processor 154 is permitted to read the data. These transfers of data from main memory 130 to cache 158 are referred to as "cache fills".

Blocks of data stored in cache 158 have an additional status bit called the "dirty" bit, and this bit is set to "clean" or "dirty" depending on whether the information in the cache differs from that in main memory 130. That is, in the event that processor 154 writes to the data in cache 158, then the cache 158 data is the most current data and differs from its counterpart in main memory 130, and this condition requires that the dirty bit be set to "dirty".

In the event that another processor, such as CPU module 120C, desires to read a block of data that is in another processor's cache (with, therefore, the corresponding cache dirty bit set to "dirty"), then a cycle is initiated wherein the most up-to-date value of that data is transferred from a cache, such as cache 158, to main memory 130. After the transfer to main memory 130 is completed, then the data is transferred from main memory 130 to a corresponding cache in the CPU module, such as CPU module 120C, desiring to read that data.

System interface 150 snoops on system bus 110 in order to monitor all read and write transactions of the various processors, 120A ... 120D. A snooping protocol is invoked between system interface 150 and cache controller 156 through the invalidate bus 160.

Figure 2:
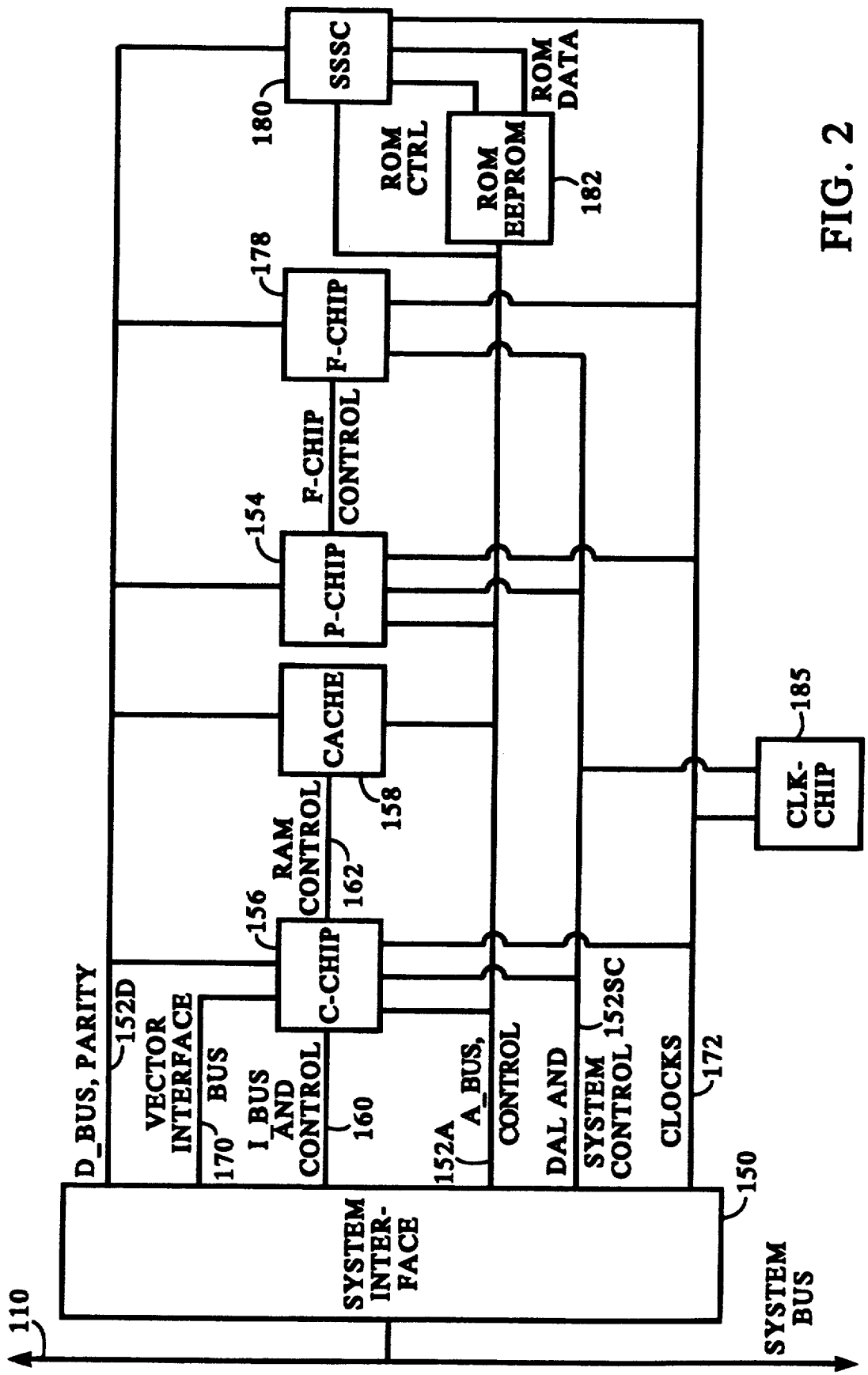
FIG. 2 is a block diagram of a processor module in accordance with the invention.

Referring now to FIG. 2, processor bus 152 is shown comprising a D_Bus 152D, and A_Bus 152A, and a "DAL and Systems Control Bus" 152SC. Also shown in FIG. 2 is a vector interface bus 170, a clock bus 172, and the invalidate bus 160. The $D_{13}$ Bus, 152D, portion of the processor bus is a data bus, the A_Bus, 152A, is an address bus, and the "DAL and Systems Control Bus" 152SC carries control signals for the $D_{13}$ Bus 152D and the A_Bus 152A.

Also shown in FIG. 2 is the cache control chip 156, the control connection 162 between the cache control chip 156 and the cache memory 158. The processor chip 154 is shown with a connection to a floating point processor chip 178. Also shown are two further storage and control chips, SSSC chip 180 the systems support chip which includes battery backed up RAM, bus reset logic, time of year clock, etc. The ROM EEPROM 182 contains data, date, etc., information.

In performing the cache write-back protocol the processor chip 154, the cache controller chip 156, and the system interface 150 must, at various times, each gain control of the processor bus 152, shown in FIG. 2 as the $D_{13}$ Bus 152D, the A_Bus 152A, and the "DAL and Systems Control Bus" 152SC.

A direct memory access, or DMA transfer, is a data transfer transaction between main memory 130 and any non-processor chip on CPU module 120B. DMA transactions pass through system interface 150.

Various aspects of the buses and signals carried thereon will next be described.

Data and Address Buses

The data and address buses D_BUS 152D and A_BUS 152A, plus their associated signals, DAL and System Control 152SC, are collectively known as the DAL. DAL is an acronym for "Data and Address Lines". The DAL carries the main data, address, and status lines used for inter-chip and system communication on processor module 120B. These signals are asynchronous only in the sense that they may change as long as AS_L (discussed further hereinbelow) is deserted. If AS_L is asserted, these signals are interpreted on a per-transaction basis.

The following shorthand notation is introduced, processor 154 is referred to as the P-Chip, and cache controller 156 is referred to as the C-Chip.

D_BUS - Data Bus The D_BUS is a 64-bit, bi-directional bus used to communicate data among the chips on CPU module 120B. All of the bits of the D_BUS go to the cache RAMs for data reads, writes, and cache fills.

$D_{13}$ Bus<63:0> are driven from the P-chip 154 to the cache memory 158 for memory write commands, and request the data to be written into the cache memory 158.

$D_{13}$ Bus<63:0> are driven from the system interface 150 to the P-chip 154 and cache memory 158 during memory read commands. The $D_{13}$ Bus is also driven from the system interface 150 to the cache memory 158 during cache fill commands. The data in both cases is received from main memory 130.

$D_{13}$ Bus<63:0> are driven from the cache memory 158 to the system interface 150 during write-back commands, and request that the data be written back to main memory 130.

A_BUS—Address Bus

The A_BUS is a 29-bit, bi-directional bus used to communicate address information among the chips of the processor module 120B. The address is a quadword address.

The C-chip uses the A_BUS as follows:

As the address source for I/O space reads and writes and memory reads and writes.

As the address source for primary cache invalidates and secondary cache writebacks (driven by the C-chip).

For a cache fill, the original read address, with bits transferred on the A_BUS.

CMD - Bus Command

The CMD lines specify the current bus transaction when AS_L is asserted.
The four bits are interpreted as follows:

(WR_L)

| CMD<3> | CMD<2:0> | Bus Transaction Type | | MC-chip Response Source | | CPU DMA |
|---|---|---|---|---|---|---|
| H | LLL | Reserved | xx | x | x | |
| H | LLH | D-stream read octaword (no lock or modify) | xx | x | x | |
| H | LHL | External processor register read | CPU | rd | x | |
| H | LHH | Read Interrupt Vector | CPU | x | x | |
| H | HLL | I-stream read quadword | CPU | rm | x | |
| H | HLH | D-stream read lock quadword | CPU | rm | x | |
| H | HHL | D-stream read quadword (modify intent) | CPU | rm | x | |
| H | HHH | D-stream read quadword (no lock or modify) | CPU | rm | x | |
| L | LLL | DMA cache fill abort | MEM | x | ca | |
| L | LLH | DMA cache fill | MEM | x | cf | |
| L | LHL | External processor register write | CPU | wr | x | |
| L | LHH | Clear write buffer | CPU | x | x | |
| L | HLL | Write no unlock octaword | C-chip | x | wo | |
| L | HLH | Write unlock quadword | CPU, C-chip | wr | wi | |
| L | HHL | Write no unlock octaword | xx | x | x | |

-continued

The CMD lines specify the current bus transaction when AS_L is asserted.
The four bits are interpreted as follows:
(WR_L)

| CMD<3> | CMD<2:0> | Bus Transaction Type | MC-chip Response Source | CPU DMA |
|---|---|---|---|---|
| L | HHH | Write no unlock quadword | CPU, C-chip | wr io |

The table above gives the decoding of CMD command source, and the response to each of the 16 possible commands.
The column labeled "source" specifies the valid source for the command.
"CPU" indicates that the command is driven by the P-chip. "C-chip" indicates that the command is driven by the C-chip via the DMR_L/DMG_L protocol. "MEM" indicates that the command is driven by the system interface via the DMR_L/DMG_L protocol.
"CPU, C-chip" indicates that the command may be driven by either the P-chip or C-chip.
"xx" indicates that this command is not used.

The C-chip response depends on the assertion of DMG_L. The column labeled "CPU" corresponds to DMG_L being deasserted, and the column labeled "DMA" corresponds to DMG_L being asserted. The responses are encoded as follows:

x - Command is ignored.
rd - C-Chip responds with data as appropriate.
rm - Cache RAMs respond with data as appropriate.
cf - C-Chip performs cache fill function.
ca - C-Chip aborts cache fill function.
wr - C-Chip writes data as appropriate.
wo - C-chip performs a writeback only.
wi - C-chip performs a writeback and invalidate.
io - C-chip performs an invalidate only.

Bus Control

The bus control signals indicate the boundaries and status of a bus transaction. These signals are synchronous with respect to the core chip clocks and must never change within the timing windows in which they are sampled. For AS_L, this requirement is true even if DMG_L is asserted.

AS_L - Address Strobe

The AS_L signal is a synchronous qualifier which indicates that the information on the DAL is valid. The assertion of AS_L indicates the start of a new transaction. AS_L remains asserted throughout the transaction and is deasserted upon completion. When DMG_L is not asserted, AS_L is driven by the P-chip to inititate read and write transactions. When DMG_L is asserted, AS_L is driven by the C-chip to initiate writeback and invalidate sequences and is received by the C-chip for cache fill sequences.

RDY_L - Ready for Next Transaction

The RDY_L signal is asserted by the bus receiver to signal normal termination of the current command. The C-chip asserts RDY_L to indicate the completion of a write command or write unlock command. The system interface asserts RDY_L to indicate the confirmation of a read transaction that has missed the cache. The C-chip looks for the assertion of RDY_L by the system interface during a writeback transaction to ensure that the data can be accepted by that component.

RTY_L - Retry Current Transaction

Under certain circumstances, a bus transaction may not be successfully completed by the system component to which it is directed. The RTY_L signal is a transaction terminator which causes the current transaction to be re-tried.

The C-chip conditionally asserts RTY_L when it asserts DMR_L in order to obtain control of the DAL for writebacks and invalidates. This RTY_L assertion will occur when there is a P-chip transaction stalled on the DAL (e.g., memory read that misses in the cache). The P-Chip responds to the assertion of RTY_L by immediately terminating the current DAL transaction in the next clock cycle, and by then asserting DMG_L.

The C-chip may also receive a RTY_L as a terminator for a writeback whose data cannot yet be accepted by the system interface (due to physical space limitations).

BC_HIT_L - cache Hit

For CPU memory reads, the C-chip asserts BC_HIT_L if the requested data is present in the cache. For read transactions, the P-chip and the F-chip 178 treat BC_HIT_L as a transaction terminator functionally equivalent to RDY_L.

A system component should not terminate a read transaction unless the C-chip has determined that the read has missed in the cache.

BC_MISS_L - cache Miss

The BC_MISS_L signal is the logical complement of the BC_HIT_L signal for CPU memory read transactions. The C-chip asserts BC_MISS_L to inform the system interface that the read has missed in the cache. For memory writes, the C-chip asserts BC_MISS_L to inform the system interface that the write has not hit an owned subblock in the cache and that the subblocks referenced by the write address on the DAL should be fetched from main memory with an ownership request.

Cache RAM Control

The cache RAM control signals are asserted by the C-chip as appropriate to control reads from and writes to the cache RAMs. There is one chip select signal for each of the 8 bytes of data and parity; there is a single write enable signal for all cache RAMs.

$BC_{WE}\_L$ - cache Write Enable

The $BC_{WE}\_L$ signal is the write enable for the entire set of external cache RAMs. The C-chip asserts $BC_{WE}\_L$ on CPU read transactions which miss in the cache, DMA cache fill transactions, and on CPU memory-space writes.

BC_CS_L - cache Chip Selects

The BC_CS_L lines supply the chip selects for each byte of data parity. The C-chip asserts BC_CS_L on a memory read to allow the cache RAMs to drive data onto the D_BUS. If the read address does not hit in the cache, the C-chip asserts $BC_{WE}\_L$, while continuing to assert BC_CS_L. The assertion of $BC_{WE}\_L$ causes the data returned by the memory subsystem to be written into the cache RAMs.

The C-chip asserts the bits in BC_CS_L that are asserted in BM_L during a memory write to allow the data to be written into the cache RAMs.

The C-chip asserts BC_CS_L during a DMA cache fill transaction to write the cache fill data to be written into the cache RAMs.

DAL Ownership

Normally, the P-chip is the owner of the DAL. Under certain circumstances, the C-chip and the system interface may require the use of the bus for invalidates, writebacks or DMA cache fills. Four signals are provided to allow system components to request and be granted ownership of the DAL.

DRM_L - DMA Request

The DRM_L signal is asserted by the C-chip when it desires ownership of the DAL to perform invalidates or write backs or to allow the system interface to perform DMA cache fills. The C-chip is the only DAL component that asserts DRM_L. The P-chip transfers bus ownership to the C-chip by asserting DMG_L. To retain ownership of the bus, the C-chip must continue to assert DRM_L until the DAL is no longer needed for DMA.

If DRM_L is asserted by the C-chip, it must remain asserted until DMG_L is asserted by the P-chip.

DMG_L - DMA Grant

The DMG_L signal is asserted by the P-chip to grant control of the DAL to the C-chip (which had previously requested it by asserting DRM_L). The C-chip requests ownership of the bus to do writebacks, invalidates, and cache fills.

When the C-chip or the system interface is done using the DAL, the C-chip de-asserts DRM_L. In response to the deasertion of DRM_L, the P-chip deasserts DMG_L and resumes ownership of the DAL.

DATA RDY_L - Data Ready

DATA RDY_L is asserted by the system interface to indicate to the C-chip that the data requested by the P-chip on a read type operation is ready to be returned, and that all invalidate requests queued before the read data returned have been transmitted to the C-chip. This signal also indicates to the C-chip that all invalidate requests currently queued in the C-chip must be processed before the read data can be returned to the P-chip. Once the C-chip has processed any invalidates that are queued, it will assert SYNC_L to allow the system interface to return the data to the P-chip on the DAL.

A write and run operation begins when a write from the processor is allowed into the cache memory 158 without first gaining ownership of the referenced block of data. Ownership is subsequently requested by the system interface 150 in order to maintain coherency in the system.

On write-and-run operations, the system interface asserts DATA_RDY_L to inform the C-chip that the first part of the cache fill data is ready to be loaded into the cache. Again, all invalidates currently queued in the C-chip must be processed before the data can be returned by the system interface. The C-chip will assert DRM_L to gain ownership of the DAL to process any currently queued invalidates. Once all invalidates have been processed, the C-chip will assert SYNC_L to pass ownership of the DAL to the system interface so that the cache fill sequence may begin.

SYNC_L - Synchronize

SYNC_L is driven from the C-chip to the system interface. SYNC_L serves a number of purposes depending on the current state of the DAL. On read type transactions generated by the P-chip, the C-chip will drive SYNC_L in response to DATA RDY_L from the system interface. The system interface must delay its assertion of RDY_L until the C-chip asserts SYNC_L. In this case, the assertion of SYNC_L informs the memory or bus interface that the C-chip has completed all invalidates that need to be processed before the read transaction can be completed on the DAL.

If the C-chip receives DATA RDY_L and is expecting a DMA cache fill sequence from the system interface, the C-chip will assert SYNC_L to inform the system interface that it may use the DAL to perform the cache fills. The system interface requires both SYNC_L with DMG_L asserted before it can begin the cache fill sequence. Either DMG_L or SYNC_L may be asserted first depending on the previous DAL transaction. When DMG_L and SYNC_L are asserted the system interface should actively drive AS_L.

Invalidate Bus and Control

The system architecture requires cache coherency among the CPUs in a multi-processor system. This requirement specifies that all memory writes done by any CPU or I/O device cause the invalidation of any data corresponding to the write address in the caches of all other CPUs.

In system environments which connect the DAL to another bus to which other CPUs or I/O devices connect, the system interface must watch the system bus and forward any invalidates to the C-chip via the Invalidate Bus (I_BUS). The C-chip will look up the invalidate address in the cache tag store. If data is cached, the C-chip will request the DAL via the DMR_L/DMG_L protocol and invalidate or writeback the appropriate data in the cache.

I_BUS - Invalidate Address Bus

The I_BUS is a 13-bit address bus used to send invalidate requests from the system interface to the C-chip. The C-chip uses this address to determine if data corresponding to the address is currently resident in the cache. Bits of the address are sent to the C-chip in one cycle and bits of the address are sent in the next cycle.

The system interface should filter out all I/O space addresses since I/O space addresses are never cached.

I_BUS may change asynchronously to the core chip clocks as long as INV_REQ_L is deasserted. If INV_REQ_L is asserted, I_BUS must be stable and valid during the sampling period in the current cycle and the next cycle.

INV_REQ_L - Invalidate Request

The assertion of INV_REQ_L by the system interface begins an invalidate request transaction. This signal need only be asserted for the first cycle of an invalidate request.

INV_CMD - Invalidate Command

INV_CMD is driven along with the I_BUS to indicate the type of invalidate transaction being performed. When INV_CMD is low it indicates that a write access to the referenced memory location is being requested. When INV_CMD is high it indicates that a read-only access to the memory location is being requested.

INV_CMD may change asynchronously to the core chip clocks as long as INV_REQ_L is deasserted. If INV_REQ_L is asserted, INV_CMD must be stable and valid. INV_CMD must be driven for both transfers of the invalidate request.

INV_SUP_L - Invalidate Suppress

The C-chip asserts INV_SUP_L when it can no longer accept invalidate requests because its invalidate queue has been filled. The system interface must not send any invalidate requests to the C-chip while INV_SUP_L is asserted.

The C-chip Design
Overview of DAL Transactions

The majority of transactions among the core chips, that is system interface 150, cache controller 156, cache memory 158, and processor 154, and the system environment are carried out using the DAL, the processor bus 152, and associated control signals. By default, the P-chip, processor 154, is owner of the DAL and the other chips receive transactions from the P-chip. By appropriately using the DMR_L/DMG_L protocol, the C-chip can request ownership and subsequently use the DAL for DMA transactions. In this case, the core chips, including the P-chip, may receive DMA transactions from the C-chip.

There is a common protocol used by most DAL transactions, whether initiated by the P-chip or by some other system component. A DAL transaction starts when the bus owner asserts AS_L. AS_L is used as a synchronous qualifier to tell other chips to the DAL that valid information is (or will be) present on A_BUS, CMD, and potentially on D_BUS.

Most DAL transactions terminate when the bus owner detects the assertion of one of the transaction termination signals: RDY_L, ERR_L, RTY_L or BC_HIT_L. ERR_L is an error signal carried on the DAL. Depending on the signal used, the transaction terminates successfully, with an error, or is retried.

In response to the assertion of one of these signals, the bus owner deasserts AS_L to terminate the transaction. There is no requirement that AS_L be deasserted immediately in response to the assertion of a transaction termination signal, but the transaction does not actually terminate until AS_L is deasserted. When AS_L is finally deasserted, however, the transaction termination signals must all be deasserted in the next cycle.

Writeback Cache Design

The cache incorporates a writeback design in which a valid cache subblock may be in two forms: read-only (clean), and write-owned (dirty).

A read-only subblock has valid data that can be read but not written by the processor. A write-owned subblock can be read and written by the processor. A clean subblock is held in cache for read-only by the associated processor. A clean copy of a given cache subblock may reside in one or more caches in the system, while no cache may contain a cache subblock that is write-owned by another cache in the system. Each cache in the system keeps track of its write-owned subblocks by assigning a "dirty" bit to each subblock. The C-chip design relies on the system bus and the memory controller to manage ownership requests and writebacks on the system bus to insure cache coherency.

A processor chip 154 may have a cache built into the processor chip 154, and this cache is referred to as the P-cache. In this event, the cache memory 158 serves as a backup cache in a two level cache implementation.

A cache subsystem gets a read-only copy of a cache subblock by issuing a read command to the system bus; a write-owned copy of a cache subblock is obtained by issuing an ownership read. As data is brought into the cache from memory, the C-chip sets a "valid" bit to signify that the data is now resident in the cache. If ownership was requested, the "dirty" bit is also set at this time.

When a processor sees an ownership read on the system bus of a subblock that is contained in its cache as a read-only copy, that cache subblock and the corresponding cache locations in the P-cache are invalidated. If the processor sees an ownership read command of a cache subblock for which it has write ownership, the cache subblock is written back to memory using the disown write command, and the copies in both caches are invalidated. When the processor sees a read command on the system bus of a cache subblock for which it has write ownership, the cache subblock is written back and the copy in the cache is marked "read-only", the P-cache copy is invalidated.

A cache block is deallocated in order to free the block.

Deallocation may require writebacks to occur in order to maintain coherency.

The cache control must also ensure that the P-cache and cache are "coherent." This coherence implies that the data resident in the cache is consistent with the data for the same address in the P-cache. If another processor in the system obtains ownership of a subblock that is resident in the P-cache, that copy of the data must be invalidated. For this purpose, the C-chip ensures that the contents of the P-cache are always a proper subset of the contents of the cache. This is done by invalidating the P-cache when a block of the cache is deallocated. By doing this, the C-chip guarantees that there is nothing in the P-cache that is not also in the cache. Keeping the P-cache as a proper subset of the cache is a practical mechanism to ensure that the contents of the P-cache are always known to the C-chip (without maintaining a copy of the P-cache tag store on the C-chip). Every time data is invalidated in or written back from the cache, the corresponding P-cache entries are invalidated.

Tag Allocation and Deallocation

The cache allocates tags for memory reads and writes that do not hit a valid block in the cache. Allocation consists of writing a new tag and clearing all of the valid and dirty bits in the entry.

The tag entry's valid and dirty bits will then be updated as the corresponding subblocks of data are filled into the cache.

If the C-chip needs to allocate a tag, but there is already another block resident in the cache at the same location, the cache needs to perform a deallocation. This deallocation includes writing back any dirty subblocks of the resident block and invalidating the P-cache for all addresses in the valid subblocks of the resident block. The tag allocation of the new block occurs immediately after the tag information of the old tag has been read out of the tag store and transferred to the invalidation logic.

Write-and-Run

One major goal for the memory subsystem is to reduce time spent by the processor on memory commands—primarily memory reads and writes. Write-and-run is a write protocol that allows as many P-chip generated memory writes as possible to write into the cache. Without write-and-run, the P-chip would only be able to write to subblocks that were both valid and dirty. Thus, if a memory write hit a clean subblock, the P-chip would have to stall for many cycles until ownership was granted from the memory. Write-and-run allows the P-chip to complete the write while the C-chip manages the ownership by itself. Thus, new data from the P-chip is written into the cache RAMs without first attaining ownership of the subblock from memory.

Also, subsequent writes to the same subblock are allowed to complete without waiting for ownership.

Invalidate Bus

The memory subsystem maintains cache coherency via a private bus between the system interface and the C-chip. This invalidate bus (or I_BUS) is used to send addresses of commands driven onto the system bus by other system components (processors or I/O devices). If another processor requests a read-only copy of a subblock, the other processors in the system must check their caches for a dirty copy of the requested subblock. If a write-owned copy, or "dirty" copy, is found, the data is written back to memory so that the requesting processor will have the most recent data. If another processor requests write ownership of a subblock, all other caches must invalidate their read-only copies of that subblock; if a processor already has write ownership of that subblock, it must writeback and invalidate the subblock to relinquish its ownership.

DMA on the DAL

The DAL is owned by the P-chip. In order for cache fills or invalidates to occur, however, other chips must be able to control the DAL. The DAL protocol allows this via the DMR/DMG protocol. The C-chip and the system interface are the only two DMA (direct memory access) devices on the DAL. The C-chip is the only DMA requester. The C-chip will assert DMR_L whenever a cache fill, a writeback or an invalidate is to be done. At times, the C-chip must interrupt a command already on the DAL to complete an invalidation (from a deallocation or from an I_BUS invalidate request). In these cases, the C-chip will assert RTY_L concurrently with DMR_L on the DAL. This termination of the P-chip command assures that DMG_L will be asserted by the P-chip. It also assures that after the C-chip deasserts DMR_L, the command previously on the DAL will be driven back onto the DAL by the P-chip.

Cache fills are DMA commands driven by the system interface to load data into the cache RAMs. If the C-chip is filling a subblock after a memory read miss, the C-chip expects exactly three fill commands. If the C-chip is filling a subblock after a memory write miss (or write-and-run), the C-chip expects exactly four fill commands. After the last expected fill command, the C-chip will set the appropriate valid and dirty bits for the subblock in the tag store.

The C-chip also uses the DMR/DMG DAL protocol to perform writebacks and invalidates.

The C-chip drives three different DMA commands: invalidate-only, writeback-and-invalidate, and writeback-only. The P-chip recognizes all three of these commands as invalidates. The C-chip responds differently for each command. The response to the invalidate-only command is to clear a valid bit. The response to the writeback-and-invalidate command is to clear both a valid bit and a dirty bit. The response to the writeback-only command is to clear a dirty bit.

System interface synchronization protocol

The C-chip utilizes a simple synchronization protocol with the system interface to coordinate which device has control of the DAL under DMA. The C-chip is the only DAL component that drives DMR_L, so the system interface must inform the C-chip when it needs to use the DAL (for cache fills). The system interface will assert DATA_RDY_L to indicate that memory data has returned and that all I_BUS requests that were received before the data came back have been forwarded to the C-chip. The C-chip must then process all of these I_BUS requests before allowing the system interface to proceed. After all of the necessary I_BUS requests have been processed, the C-chip asserts SYNC_L to the system interface. Only after the system interface receives SYNC_L will it begin driving data on the DAL.

The DATA_RDY/SYNC protocol is also used to return data to a DAL read that missed in the cache. For memory read misses, DATA_RDY_L is asserted when the first quadword of the read data has returned. The system interface cannot terminate the read command on the DAL until the C-chip has asserted SYNC_. Once SYNC_L is asserted by the C-chip, it remains asserted until all of the cache fills for the subblock are performed (the fills do not begin until DMG_L has been asserted by the P-chip after completing the read transaction).

DATA_RDY_L is also asserted during DAL commands that are not directed towards the C-chip. If during these commands, the system interface needs to ensure that all I_BUS requests have been serviced at an arbitrary synchronization point, it will assert DATA_RDY_L to indicate that the last I_BUS request that is needed to complete has been submitted to the C-chip. The C-chip will then assert SYNC when it no longer needs to service more I_BUS requests.

C-chip Operation

The functions listed are initiated by the P-chip via the DAL. P-chip initiated functions include memory reads and memory writes. Each of these transactions is briefly discussed in the following paragraphs.

Memory Reads

The C-chip responds to memory read references by performing a tag store lookup and determining whether the reference can be serviced by the cache. If so, BC_HIT_L is asserted and the data is returned to the P-chip via the DAL. The C-chip will respond with BC_HIT_L to reads that hit valid subblocks.

If the C-chip does not find a valid subblock in the cache, it asserts BC_MISS_L to the system interface. The system interface then sends a read command over the system bus in order to bring the required data into the cache subsystem. When the data has returned to the system interface the system interface has forwarded all invalidate requests that were received before the data was received from memory, and it asserts DATA_RDY_L. If the C-chip has no pending invalidate requests, it responds with SYNC_L. If there are invalidates already in the C-chip when DATA_RDY_L is received, the C-chip delays the assertion of SYNC_L until they have all been serviced. When the C-chip drives SYNC_L, it will also drive DMR_L to the P-chip. The data requested by the memory read is written into the cache RAMs and the primary cache to fulfill the memory read transaction generated by the P-chip. The system interface terminates the memory read with RDY_L and the P-chip asserts DMG_L after deasserting AS_L. The system interface then sends the rest of the data associated with the requested data subblock to the cache via cache fills. After the last fill has been received by the C-chip, the valid bit associated with the newly-filled subblock will be set, and SYNC_L will be deasserted.

A cache miss may require the deallocation, ie. writing back and invalidating an already resident block of data that uses the same cache location as the current read, of a block from the cache in order to make room for the new data. If that is the case, the C-chip writes back to memory any dirty subblocks of the deallocated block. Also, in order to maintain coherency between the P-cache and the cache, the C-chip invalidates addresses in the P-cache that fall in any valid subblocks of the deallocated block. Furthermore, if any invalidate requests hit in the cache, they must be serviced before SYNC_L is asserted.

If the C-chip must perform a writeback or an invalidate before the memory read transaction has completed, the C-chip will assert DMR_L and RTY_L to the P-chip (after asserting BC_MISS_L to the system interface). The P-chip will then assert DMG_L, allowing the C-chip to perform writebacks and invalidates as necessary. The C-chip continues to assert DMR_L after it is done with all necessary DMA commands until DATA_RDY_L has been received. The C-chip maintains control of the DAL in this way so that any subsequent I_BUS requests can be serviced easily before DATA_RDY_L is asserted.

After DATA_RDY_L is asserted and all of the I_BUS requests have been serviced, the C-chip will deassert DMR_L, and assert SYNC_L. When the P-chip sends the memory read out again, the C-chip will assert BC_MISS_L and DMR_L again (since the subblock is still not in the cache). Because the system interface has already asserted DATA_RDY_L, the data is already available to drive onto the DAL. The rest of the transaction then proceeds as before, ending with the last fill entering the cache.

Memory Writes

Memory writes that hit valid subblocks in the cache or that miss but no deallocation is necessary, will be terminated with RDY_L by the C-chip. All of these transactions are allowed to write into the RAMs; BC_CS_L will be driven with the BM_L that is received on the DAL with the write command. BC_MISS_L will be asserted for writes that do not hit a dirty subblock. The BM_L is saved for all writes that are allowed to transfer data into the cache without first gaining ownership. The BM_L bits are logically "OR"ed to track which bits of the subblock have been updated by the P-chip.

If the memory write misses, the C-chip will expect the system interface to send the fill data for the subblock. Once the data is fetched from memory (via an ownership request and the system interface has forwarded all invalidate requests that were received before the data was received from memory, the system interface will assert DATA_RDY_L. The C-chip asserts SYNC_L and DMR_L when all pending I_BUS requests have been serviced. When the system interface receives DMG_L from the P-chip, it will drive the cache fills on the DAL. After the last fill, the C-chip sets the valid and dirty bits for the subblock.

If a cache miss occurs for a memory write and the cache block is valid, the C-chip must deallocate the block before allowing the new data into the cache. The C-chip will terminate the transaction with RTY_L, and assert BC_MISS_L to instruct the system interface to begin an ownership request. The C-chip will also assert DMR_L to gain ownership of the DAL. Once DMG_L has been asserted, the C-chip will invalidate or writeback the block. When the C-chip is done with its invalidates and writebacks, it will wait with DMR_L asserted until DATA_RDY_L is asserted by the system interface. All pending I_BUS requests are then satisfied before asserting SYNC_L. The four cache fills will then be sent by the system interface; SYNC_L is deasserted after the fourth fill. Pending invalidates and writebacks are performed after the last fill. If no other DMA is required, DMR_L is deasserted.

OPERATION OF THE PROCESSOR BUS ALLOCATION PROTOCOL, DMR_L/DMG_L Protocol and SYNC_L Protocol The C-chip 156 is enabled to reply to a DATA_RDY from the system interface 150 with SYNC_L after the following operations have been accomplished.

The system interface 150 snoops on the system bus 110 looking for read and write transactions, and queuing the transactions for inquiry as to whether the referenced memory locations reside within cache memory 158. Each CPU module 120A ... 120D tests the referenced memory locations of each transaction generated from the other CPU modules. If the referenced memory location resides within cache memory in any CPU module, such as cache memory 158 on CPU module 120B, then the status of the cache data determines the next action taken by the system. In the event that CPU 154 has previously written to the cache 158 block referenced in a system bus 110 transaction generated by a different CPU, the cache data must be written back to main memory 130 before the system bus 110 transaction can proceed. In the event that the system bus transaction is a write by another processor module to main memory 130, then the valid bit and the dirty bit in the tag store on the cache controller 156 must be set to indicate that the cache data is invalid and no longer owned. All transactions that require testing the cache contents against a system bus 110 transaction are referred to as "invalidate requests".

A queue of invalidate requests must be maintained, as they are serviced on a cycle stealing basis during operation of processor 154, and the queue is referred to as the invalidate queue. The invalidate queue is maintained, first in the system interface 150 as it is read from system bus 110 through bus snooping, and the invalidate request is then moved to a more extended queue on the cache control chip 156. A flush bit is maintained as a status bit to aid in maintaining the invalidate queue. The invalidate requests are serviced from the top of the invalidate queue as cycles become available from the processor 154.

When a READ or OWNERSHIP REQUEST returns from system bus 110 for CPU module 120B, the system interface 150 sets all of its flush bits for the queue entries that are valid.

When the last valid entry that needs to be flushed leaves the system interface 150, DATA_RDY_L is asserted by system interface 150 for one cycle. Invalidate requests which have arrived after the system bus 110 transaction do not need to be flushed because synchronization rules require that only the invalidate requests preceding in time the system bus transaction must be serviced before the system bus transaction can be allowed to proceed, and these later invalidate requests do not have the flush bit set. When the C-chip sees the DATA_RDY_L signal, it sets all of its flush bits for its valid queue entries. The flush bits are cleared as the invalidate requests are serviced. After all of the flush bits are clear in the C-chip and there are no more writebacks or invalidates to be done, the C-chip asserts SYNC_L which tells the system interface 150 that it can send the READ data out on the DAL.

Two independent mechanisms are required in the operation of the system interface 150 and the cache controller 156. The first one is the mechanism that the system interface 150 uses to determine when to assert its DATA_RDY signal.

The second mechanism is used by the cache controller 156 to determine when to assert the SYNC_L signal in response to the DATA_RDY signal. Both mechanisms are based on the same principle. The principle involves marking entries in the invalidate queue that are required to be "serviced" before the read request can be returned by the system interface 130 to the processor requesting the system bus 110 transaction. This requirement is defined by requirements of memory traffic ordering adopted for synchronization of the multiple processors using the shared memory. The method used to mark the entries is to include a flush bit with every invalidate queue entry. When the system interface receives the first quadword from memory for the read request, it sets the flush bit for every entry in the invalidate queue that already has a valid bit set. The valid bit is the indication that an invalidate request is queued in this particular invalidate queue entry. The queue continues on as normal, with the system interface 150 sending the "top of queue" across the I-bus 160 to the C-chip 156. Also, new invalidate requests can be entering the "bottom of queue" on the system interface 150. These entries will not have their flush bits set, because they have occurred after the first quadword was received from memory, and these need not be serviced before the read, or other system bus 110 transaction.

When a queue entry has been successfully transmitted from the system interface to the C-chip, the system interface 150 clears both the valid bit and the flush bit. When all of the flush bits are cleared in its queue, the system interface 150 sends the DATA_RDY signal to the C-chip. Upon receipt of DATA_RDY, the C-chip then sets all flush bits for valid entries in its queue. The C-chip clears a particular entry's valid and flush bit when that address has been looked up in the tag store. If the invalidate does not need to be done, the address is just "dropped" or ignored. If an invalidate needs to be done, the invalidate address is sent to the invalidate latch. This latch also has a valid bit and flush bit associated with it. This latch can be thought of as the destination of invalidate requests from the queue that "hit" in the tag store and are waiting for the C-chip to control the DAL 152 so that the invalidate or writeback can take place.

When the C-chip 156 gains ownership of the DAL 152, the invalidate address moves from the invalidate latch to the DMA latch (and the valid and flush bits in the invalidate latch are cleared). The DMA latch has a valid bit associated with it. When the C-chip 156 has ownership of the DAL 152 and the DMA latch has a valid bit set, the C-chip begins performing whatever command (invalidate, or writeback, or writeback-and-invalidate) dictated by the invalidate request whose address is residing in the DMA latch. When all activity related to the address in the DMA latch is complete, its valid bit is cleared.

The C-chip has as internal components the invalidate latch and the DMA latch, and these two latches are used in invalidate transactions with the invalidate queue. So, when all of the invalidate queue flush bits are clear, and when the invalidate latch flush bit is clear, and the DMA latch valid bit is clear, then (and only then) will the C-chip reply to a DATA_RDY signal with the assertion of SYNC_L.

Table 1, hereinbelow, illustrates the ownership of the DAL 152 based upon the grant signal from the processor 154 DMG_L and upon the grant signal from the cache controller 156 SYNC_L.

TABLE 1

| DMG_L | SYNC_L | DAL owner |
|---|---|---|
| not asserted | x | P-Chip 154 for memory reads, writes |
| asserted | not asserted | C-chip 156 for writebacks, invalidates |
| asserted | asserted | system interface for cache fills | x denotes "don't care"

If DMG_L is not asserted, the P-Chip has ownership of the DAL regardless of the state of SYNC_L from the C-Chip. If the C-Chip has requested the DAL (via the assertion of DMR_L), and the P-Chip has granted DAL ownership (via the assertion of DMG_L), then the value of SYNC_L decides the bus ownership between the C-Chip 156 and the system interface 150. If DMG_L is asserted and SYNC_L is not asserted, the C-Chip maintains DAL control for writebacks and invalidates. If both DMG_L and SYNC_L are asserted, the system interface 150 receives DAL ownership for cache fills.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. An apparatus to control a write-back cache, comprising:
    a processor bus;
    a system interface connected to said processor bus;
    a processor connected to said processor bus;
    a cache memory connected to said processor bus;
    a cache controller connected to said processor bus;
    first request means for said cache controller to request from said processor control of said processor bus;
    means for said processor to grant control of said processor bus to said cache controller;
    second request means for said system interface to request control of said processor bus from said cache controller; and
    means, responsive to said second request means, for said cache controller to grant control of said processor bus to said system interface, after said processor has granted control of said processor bus to said cache controller 2. The apparatus as in claim 1 further comprising:
    means for said cache controller to interruptingly request control of said processor bus from said processor.

3. The apparatus as in claim 2 wherein said means for said cache controller to interruptingly request control of said processor bus from said processor further comprises:
    means for said cache controller to assert a retry signal; and
    means for said processor to give control of said processor bus to said cache controller upon receipt of said retry signal.

4. The apparatus as in claim 1 further comprising:
    means for said cache controller to assert said first request means for said cache controller to request control of said processor bus, simultaneously with asserting a retry signal to interruptingly request control of said processor bus.

5. The apparatus as in claim 1 or claim 4 wherein said first request means further comprises a bus request signal.

6. The apparatus as in claim 5 wherein said processor responds to said retry signal with higher priority than to said bus request signal.

7. An apparatus to control a write-back cache, comprising:
   a processor bus;
   a system interface connected to said processor bus;
   a processor connected to said processor bus;
   a cache memory connected to said processor bus;
   a cache controller connected to said processor bus;
   first decision means for said cache controller to decide when writebacks and invalidates need to be performed in order to keep a remote one processor of a plurality of procesors communicating via said system bus from stalling;
   second decision means for said cache controller to decide when cache fills may be performed to said cache memory;
   means, responsive to said first decision means and to said second decision means, for said cache controller to assert a bus request signal when cache fills may be performed, and for said cache controller to assert said bus request signal and a retry signal when a writeback transaction needs to be performed and when an invalidate transaction needs to be performed; and
   means for said processor to grant control of said processor bus to said cache controller immediately after receiving both said bus request signal and said retry signal 8. A method for controlling a write-back cache in a system having a system interface, a processor, a cache memory, and a cache controller connected to a processor bus, said method comprising the steps of:
   requesting control of said processor bus by said cache controller, said request directed to said processor;
   granting control of said processor bus to said cache controller by said processor;
   requesting control of said processor bus from said cache controller by said system interface; and
   granting control of said processor bus to said system interface by said cache controller, in response to said requesting control from said cache controller by said system interface, and after control of said processor bus has been granted to said cache controller by said processor.

9. A computer system, comprising:
   a processor bus;
   a processor connected to said processor bus having means for granting, while not waiting for delivery of read data, control of said processor bus to a requestor asserting a non-interrupting request;
   a cache memory connected to said processor bus to provide data to said processor in response to a processor read hit;
   a system interface connected to said processor bus and having means for requesting control of said processor bus to store data in said cache memory in response to a processor read miss, said system interface to be connected to a system bus;
   a cache controller having means for non-interruptingly requesting from said processor control of said processor bus in response to a processor read miss and means for granting to said system interface control of said processor bus to enable said system interface to store data obtained from said system bus into said cache memory.

10. A computer system according to claim 9, wherein said non-interrupting request is represented by the assertion of a DMA request signal generated by said cache controller and received by said processor.

11. A computer system according to claim 9, wherein said processor has means for granting, while waiting for the delivery of read data, control of said processor bus in response to an interrupting request, and wherein said cache controller is connected to said processor bus and has means for interruptingly requesting from said processor control of said processor bus during an interval between a processor read miss and a subsequent request by said system interface for control of said processor bus.

12. A computer system according to claim 11, wherein said interrupting request is represented by the simultaneous assertion of a retry signal and a DMA request signal generated by said cache controller and received by said processor.

13. A computer system according to claim 11, further comprising an invalidate bus connected to said cache controller and to said system interface to transfer from said system interface to said cache controller during said interval the addresses of cache blocks to be invalidated, and wherein said cache controller has means for writing back from said cache memory to said system interface dirty ones of those cache blocks to be invalidated during said interval.

14. A computer system according to claim 9, further comprising an invalidate bus to transfer from said system interface to said cache controller the addresses of cache blocks to be invalidated, and wherein said processor has a primary cache connected to said processor bus to receive from said cache controller the addresses of cache blocks to be invalidated.

15. A computer system, comprising:
   a processor bus;
   an invalidate bus;
   a processor connected to said processor bus having (i) a primary cache connected to said processor bus; (ii) means for granting, while not waiting for delivery of read data, control of said processor bus in response to a non-interrupting request; and (iii) means for granting, while waiting for the delivery of read data, control of said processor bus in response to an interrupting request;
   a cache memory connected to said processor bus to provide data to said processor in response to a processor read hit;
   a system interface connected to said processor bus and to said invalidate bus having (i) means for requesting control of said processor bus to store data in said cache memory in response to a processor read miss; and (ii) means for sending over said invalidate bus the addresses of cache blocks to be invalidated;
   a cache controller connected to said processor bus and to said invalidate bus to receive from said system interface the addresses of cache blocks to be invalidated, said cache controller having (i) means for non-interruptingly requesting from said processor control of said processor bus in response to a processor read miss; (ii) means for granting to said system interface control of said processor bus to enable said system interface to store data in said cache memory; (iii) means for interruptingly requesting from said processor control of said processor bus during an interval between a processor read miss and a subsequent request by said system interface for control of said processor bus; (iv) means for sending to said primary cache over said processor bus the addresses of cache blocks to be invalidated during said interval; and (v) means for writing back from said cache memory to said system interface dirty ones of those cache blocks to be invalidated during said interval.

16. A computer system according to claim 15, wherein said non-interrupting request is represented by the assertion of a DMA request signal generated by said cache controller and received by said processor.

17. A computer system according to claim 15, wherein said interrupting request is represented by the simultaneous assertion of retry and DMA request signals generated by said cache controller and received by said processor.

18. A method of operating a computer system having a processor, cache memory, system interface, and cache controller connected to a processor bus, comprising the steps of:

requesting the transfer of control of said processor bus non-interruptingly from said processor to said cache controller when a read miss occurs;

transferring control of said processor bus from said processor to said cache controller when a read miss completes; and transferring control of said processor bus from said cache controller to said system interface after a read miss completes to enable said system interface to store fill data in said cache memory.

19. A method as set forth in claim 18, further comprising the steps of:

transferring from said system interface to said cache controller during an interval between a processor read miss and a subsequent request by said system interface for control of said processor bus the addresses of cache blocks to be invalidated;

transferring control of said processor bus interruptingly from said processor to said cache controller during said interval; and writing back from said cache memory to said system interface, under the control of said cache controller, dirty ones of those cache blocks to be invalidated during said interval.

* * * * *